April 26, 1966 — J. ROSÁN ETAL — 3,247,878
FLOATING THIN WALL INSERT
Filed May 25, 1962
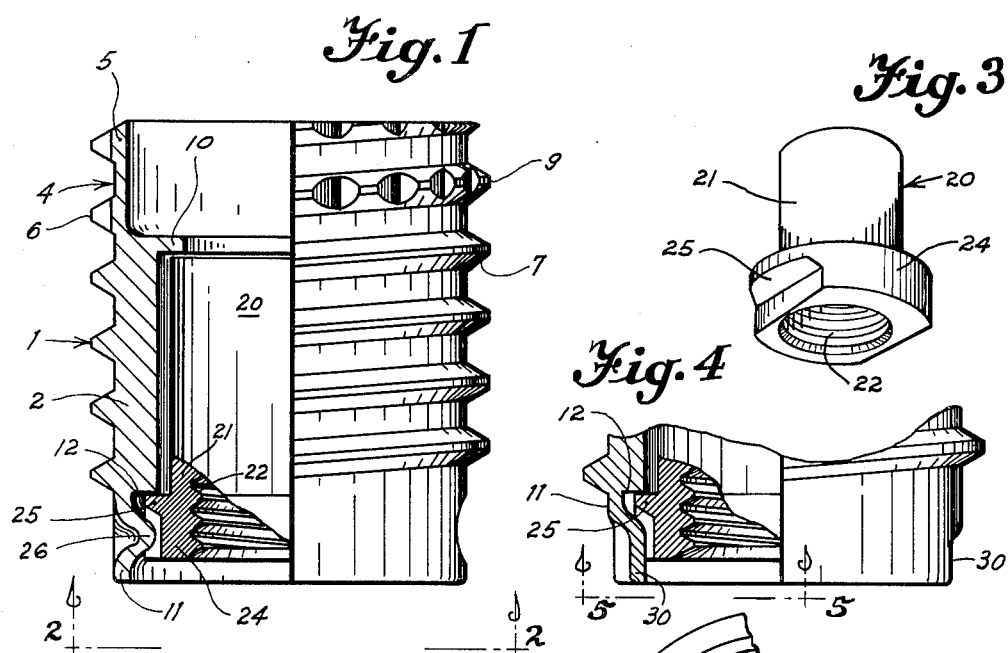
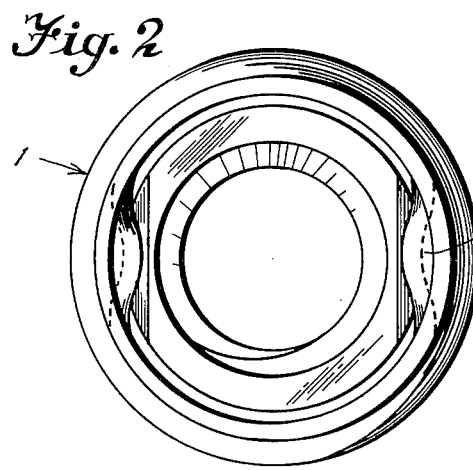
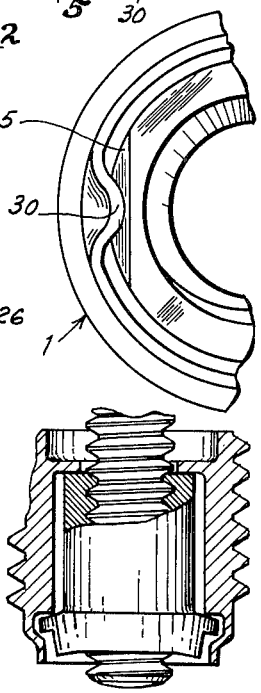
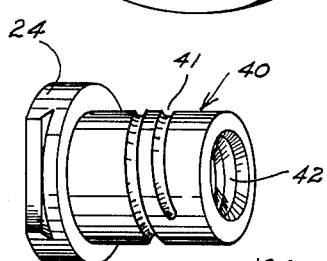
INVENTORS
José Rosán
Albert Jack La Torre
BY
P. Munro Redman
ATTORNEY

United States Patent Office 3,247,878
Patented Apr. 26, 1966

3,247,878
FLOATING THIN WALL INSERT
José Rosán, San Juan Capistrano, and Albert Jack La Torre, Santa Ana, Calif., assignors to Rosan Engineering Corporation, Newport Beach, Calif., a corporation of California
Filed May 25, 1962, Ser. No. 197,663
2 Claims. (Cl. 151—41.73)

This invention relates to an insert type fastener and, more particularly, to an insert type fastener incorporating an internally located float having a threaded internal bore adapted to receive an associated male fastener for threaded engagement in said internal bore.

One of the common problems confronted in the fastening of various types of articles together is the mismating of the holes in the mounting and the mounted parts. For instance, it is quite common in aircraft fabrication to provide a large number of access openings which are commonly covered by access panels or doors to facilitate the servicing and repair of the aircraft with which they are associaed. Mislocation of the fastener holes in the frame of the access opening and the openings in the access panels is quite common and to overcome this deficiency various types of fasteners incorporating floating, self adjusting components have been utilized. Such prior art expedients have commonly been mounted by means of rivets or similar fasteners on the frame surrounding the periphery of the access opening. Therefore, the tensile stress to which the fasteners located in said expedients could be subjected was limited by the tensile strength of the mounting rivets.

Another difficulty encountered in the fastener art is the problem of inserting fasteners in relatively soft materials such as aluminum and plastics. To overcome such difficulties various types of inserts have been utilized for the reception of fasteners adapted to support mounted parts. The concept of the present invention is intended to solve both of the aforementioned problems by the provision of an insert having a cylindrical external body provided with external threads adapted to mate with a correspondingly threaded bore in a workpiece of softer material than said external body and having an internal, cylindrical floating body incorporating internal threads adapted to be engaged by a male fastener operatively disposed therein.

While attempts have been made in the prior art to provide insert type fasteners incorporating internal floats, such prior expedients have been characterized by the utilization of a multiplicity of component parts and have been difficult to manufacture and unsatisfactory in performance. It is, therefore, an object of the invention to provide an insert type fastener consisting of an external cylindrical body and an internal cylindrical float, the operative relationship between said external body and internal float being constituted by integral portions of said exteral body and internal float.

Another object of the invention is the provision, in an insert type fastener of the aforementioned character, of an external body having an abutment thereupon and an internal float incorporating an integral retainer adapted to maintain said float in operative relationship with said external body, said external body and said float having secondary abutments adapted to cooperate with each other when a male fastener is inserted in said float to lock said float against axial and radial movement in said external body and to distribute the loads imposed on said float by the aforesaid male fastener equally throughout said external body and in such a manner as to render said float, functionally, an integral part of said external body.

A further object of this invention is to provide a fastener of the aforementioned character, wherein when said internal float is subjected to an axial load, there is imparted to said float the tensile strength characteristics of the external cylindrical body.

A further object is to reduce the number of parts to a maximum of two.

Another object of the invention is the provision of an insert type fastener of the aforementioned character wherein the sole means of maintaining said external body and internal float in operative relationship with each other is constituted by the engagement of integral portions of the said body and said float with each other.

A further object of the invention is the provision of an insert type fastener of the aforementioned character which is particularly adapted to be utilized with an external insert body characterized by the incorporation of a relatively thin wall. However, as will be appreciated from the disclosure appearing hereinbelow, the teachings of the invention are applicable with equal cogency to all types of insert fastener external bodies whether they be of thin wall or relatively thick wall configuration.

A further object of the invention is the provision of an insert type fastener characterized by the incorporation of an internal float adapted to accommodate itself to mislocated male fasteners inserted in said float, said float having retention means thereupon engageable with corresponding means on the wall of the external body of said insert.

The objects of this invention thus include providing an insert of superior holding power, and having an inner portion with an internal rotational axis which is adjustable relative to the rotational axis of the outer member over a substantial range.

Another object is to provide a very thin-walled insert having a fixed outer member for engagement with relatively soft parent material and a movable inner member affording threaded means for fixed attachment, but adjustable in axial position relative to the outer member.

Still another object is to provide a very thin-walled insert having an adjustable feature between an inner and an outer portion.

A further object is to eliminate the necessity for extreme accuracy in the location of bores for the attachment of threaded parts.

These and other objects may be better understood from an inspection of the accompanying drawings in which:

FIG. 1 shows in fragmentary quarter sectional side elevation, a thin-walled insert combination having an interior portion adjustable relative to the exterior portion.

FIG. 1A is a fragmentary schematic view partially in section showing the relation of the insert part when tensile stress has been applied to the bolt member.

FIG 2 is a top view showing details of construction of the insert of FIG. 1.

FIG. 3 is a view in perspective of the interior element of the insert of FIGS. 1 and 2 removed from its location, as shown in FIG. 1, and rotated 180°.

FIG. 4 is a fragmentary view corresponding to that of FIG. 1, but showing a modified arrangement at the lower end of the outer portion of the insert.

FIG. 5 is a fragmentary bottom view of the embodiment of FIG. 4; and

FIG. 6 is a perspective view corresponding to that of FIG. 3, but rotated 90° and showing a different type of internal locking arrangement.

Referring now to the embodiment illustrated in FIG. 1, the applicants have provided an adjustable relationship between an internally threaded inner member, which engages a mating bolt, and an externally threaded outer member, which is locked in the parent material. The insert, generally indicated as 1, has an outer member 2, which is generally cylindrical in shape. At the upper end 4 the insert has reduced thickness wall portions 5, which are formed with external knurling 6 following generally in the pattern of a thread helix 7 which surrounds the main body of the insert. The main body is thus threaded at 7 in order to provide for the emplacement of the insert in a threaded bore in parent material, not shown. Ordinarily the parent material will be of a metal or plastic which is softer than the high strength material of the insert, the latter being usually steel of 17-4PH or better. When the insert has been screwed into the threaded bore, the upper end 4 is swaged outwardly into the parent material, the knurled teeth 9 penetrating thereinto by virtue of their superior hardness. When so expanded, a permanent lock of the insert is effected which will insure its retention in place throughout its life.

In the event that it should become necessary, however, to remove the insert at some later time, this may be accomplished by drilling out the collar portion. Within the reduced thickness upper wall portions 5 is formed an internally extending annular shoulder 10, which serves as the upper retention means for an inner insert member 20. At the opposite end, or lower portion 11 of the outer member 2, the wall thickness is reduced similarly to that at 5, for a reason to be explained hereafter. Member 20, seen in FIG. 1, and shown removed from its surroundings and inverted in FIG. 3, also has a generally cylindrical conformation. Its main body portion 21 is internally threaded at 22 to receive a threaded member to be attached to the parent material. An internal locking arrangement is provided in this member in order to prevent the loosening of an inserted bolt, not shown, from its position. The resulting advantages are vibration-proof locking under the most extreme conditions of resonant loading. At the lower end of the inner insert body 21 is formed a relatively thick-walled head portion 24, which is flanged at 25 to form diametrically opposed locking ears for engagement with a portion of the outer member 2. When the insert member 20 has been inserted in the outer member 2, it is retained in position adjustably by squeezing or dimpling a portion of the reduced thickness outer wall of lower portion 11, as shown at 26.

The reduced wall thickness affords an annular lower shoulder 12 against which the head portion 24 bears in order to prevent axial movement of the inner insert in an upward direction, as shown in FIG. 1. Dimpling prevents movement through an excessive distance in the opposite axial direction. At the same time, this construction does not interfere with the lateral movement, or float, in a direction normal to the rotational axes of the inner and outer members 20 and 2, respectively. Thus, adjustment is provided to enable the insertion of threaded members in the inner insert member 20, even though the bore in which the outer member 2 was threaded had not been positioned with absolute accuracy. The tensile stress received through the inserted bolt, not shown, is primarily carried by the head 24 in engagement with the shoulder 12. As the load increases some change in the length of the wall of the inner member 20 will occur, resulting in the transfer of a portion of the load to the upper shoulder 10. The spaced or dual bearing surfaces offered by the shoulders 10 and 12 thus act to distribute the axial load applied between the outer and the inner members 2 and 20, respectively, more uniformly.

The result of this construction is that even with loading which is not applied exactly along the rotational axis of the parts, that is, with non-axial loading, sufficient bearing surfaces are still provided to withstand fracture, and in consequence this insert develops high load carrying capacity.

The over-all length of the externally threaded portion is a factor in the design balance which results in each thread carrying an equal share of the load, and produces a uniform load distribution on the external threads, insuring the absence of shear failure in the tensile stress area. Such failure is common in other prior art inserts of this general type, but is prevented in the instant case by the assumption by the shoulder 10 of a portion of the load applied through the inner member 20.

Thus, the load is transferred between the inner member and the outer member. The stresses are first transferred between the inner member and the bolt. The inner member in turn transmits the load to the bolt, and the end result is that the full tensile stress of the mating bolt is realized.

When a bolt capable of holding 180,000 to 200,000 p.s.i. is used and tested with such an insert installed in a 30,000 p.s.i. soft aluminum sand cast material, the result is an ultimate failure of the bolt, leaving the insert intact and reusable. This serves to point up the fact that this insert becomes, in effect, an integral and supporting part of the parent material.

In FIGS. 4 and 5, there is illustrated an alternative form of means for retaining the inner member 20 in position within the outer insert member 2. In these embodiments, in place of the dimple 26, shown in FIG. 1, channels 30 are formed on each side of the outer member in diametrically opposed positions, as seen most clearly in FIG. 4. These channels accomplish the same purpose in retaining the inner member, as do the dimples 26 in the embodiment of FIGS. 1 and 2. The channels 30 permit the same degree of limited movement parallel to the axis, and the same amount of "float" normal to the axis, as do the dimples 26 of FIGS. 1 and 2.

It will thus be seen that an insert has been described which permits the axial adjustment of the inner insert member relative to the outer insert member in order to accommodate small inaccuracies in the drilling of a bore in parent material. This adjsutment is attained without sacrificing the advantages inherent even in thin walled inserts. Although the embodiments shown in FIGS. 1-3 utilize a preferred locking arrangement, other thread locking arrangements are possible, and an alternative embodiment has been illustrated in FIG. 6.

In FIG. 6, there is shown an inner member 40 removed from its normal position. This member 40 has been externally rolled at 41, following the internal thread helix through an arc of the order of one or more convolutions to accomplish an inward deformation of the internal thread 42. This deformation will result in a locking of the thread about a part inserted therein without damaging the threads of either that part or of the member 40. This external rolling and the resulting external and internal deformation may be either continuous or intermittent.

From the above description it will be seen that there has been provided a light weight thin walled insert which affords a strong, reliable means for anchoring associated parts even in relatively soft parent material. This anchoring means allows for lateral adjustment to overcome minor inaccuracies in hole placement, or in part size variation, without loss of strength in the attaching means, and axially distributes the load over the insert to take advantage of the ultimate strength of the mating bolts.

What is claimed is:
1. In an insert adapted to be installed in a bore of a workpiece, the combination of:
   a first cylindrical body having external threads on a portion thereof, said body being provided with an internal annular shoulder, said body being further provided with inwardly extending body indentations in spaced relationship with said annular shoulder so as to form a retaining cavity therewith;
   an integral locking head provided by said first body, said locking head being adapted to be outwardly radially deformed so as to become embedded in the bore of a workpiece, thereby preventing rotational movement thereof relative to said workpiece;
   a second cylindrical body disposed within said first body and laterally spaced therefrom, said second body being provided with a threaded bore and a load bearing annular radial flange projecting from said body, a portion of said annular radial flange being loosely accommodated in said retaining cavity thereby permitting limited longitudinal movement of said second body relative to said first body, said flange provided with a recess, said inwardly extending indentations provided by said first body being loosely accommodated in said recess so that said second body is permitted limited lateral movement relative to said first body.

2. In an insert adapted to be installed in a bore of a workpiece, the combination of:

a first cylindrical body having external threads on a portion thereof, said body provided with inwardly extending body indentations and an internal annular shoulder, said body being further provided with an internal annular flange longitudinally spaced from said annular shoulder;

an integral locking head provided by said first body, said locking head being adapted to be outwardly radially deformed so as to become embedded in the bore of a workpiece, thereby preventing rotational movement thereof relative to said workpiece;

a second cylindrical body disposed within said first body and laterally spaced therefrom, said second body being provided with a threaded bore and a load bearing annular radial flange projecting from said body, said annular radial flange being in longitudinal engagement with said shoulder so as to be in load bearing relationship therewith, the axial distance between the upper face of said load bearing flange and the upper end of said second cylindrical body being less than the longitudinal distance between said annular flange and said annular shoulder of said first body, said annular radial flange carried by said second body being provided with a recess, said inwardly extending indentations provided by said first body being loosely accommodated in said recess so that said second body is permitted limited longitudinal and lateral movement with respect to said first body.

References Cited by the Examiner

UNITED STATES PATENTS

| | | | |
|---|---|---|---|
| 2,403,810 | 7/1946 | Lord | 151—41.73 |
| 2,577,810 | 12/1951 | Rosan | 151—41.72 |
| 2,827,097 | 3/1958 | Nuss | 151—41.73 |
| 2,984,279 | 5/1961 | Rosan | 151—41.73 |
| 3,019,865 | 2/1962 | Rohe | 151—41.7 |
| 3,065,983 | 11/1962 | Flumerfelt. | |
| 3,079,970 | 3/1963 | Barry | 151—41.73 |
| 3,081,808 | 3/1963 | Rosan et al. | 151—41.73 |
| 3,130,765 | 4/1964 | Neuschotz | 151—41.73 |
| 3,163,197 | 12/1964 | Rosan | 151—41.73 |

EDWARD C. ALLEN, *Primary Examiner.*

C. B. ELDERKIN, *Assistant Examiner.*